VOLTAGE SURGE ELECTRONIC CONTROL CIRCUIT AND METHOD
Original Filed Nov. 18, 1966
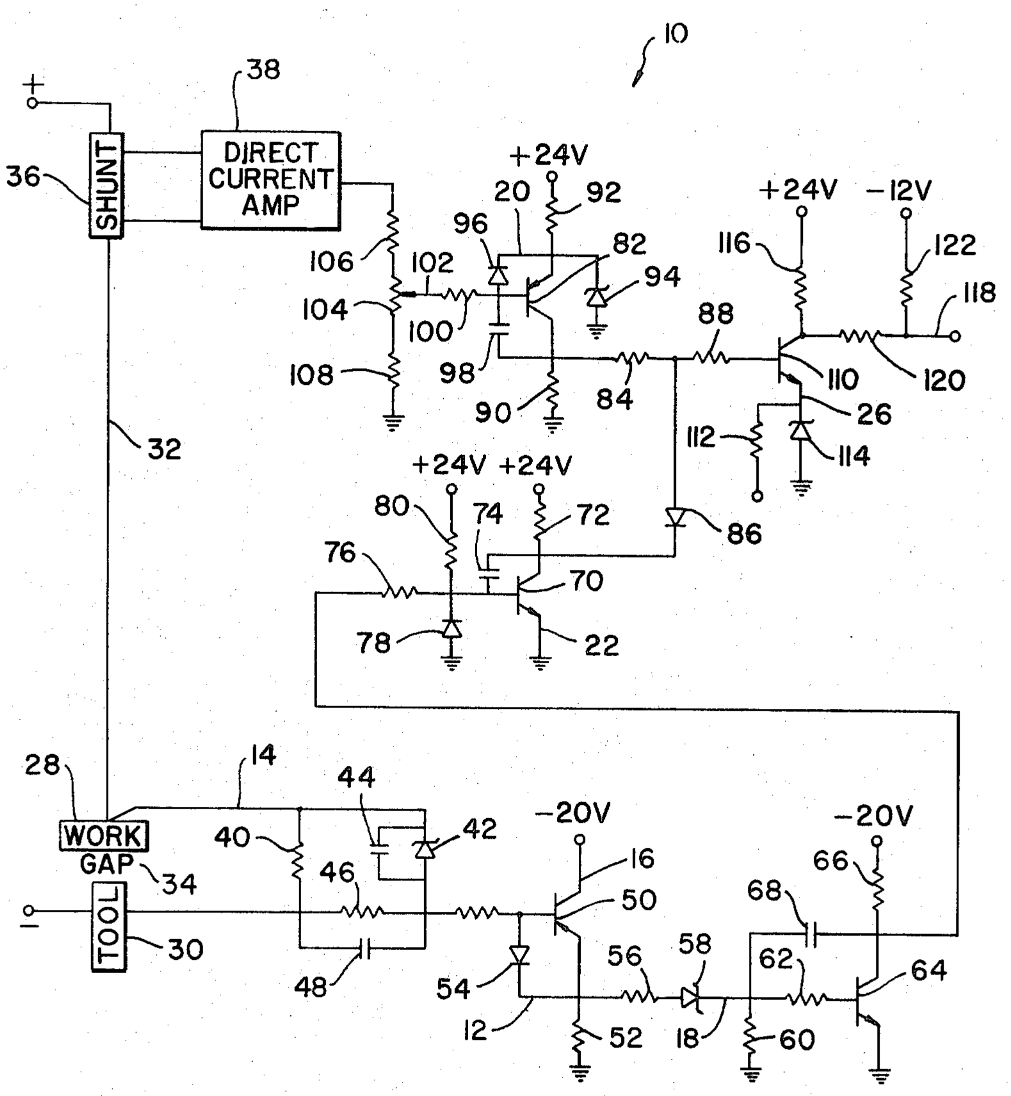
INVENTOR.
ROBERT W. DRUSHEL
BY Whittemore Hulbert & Belknap
ATTORNEYS United States Patent Office 3,761,366

Patented Sept. 25, 1973

3,761,366
VOLTAGE SURGE ELECTRONIC CONTROL CIRCUIT AND METHOD

Robert W. Drushel, Farmington, Mich., assignor to Ex-Cell-O Corporation, Detroit, Mich.

Application Nov. 18, 1966, Ser. No. 595,442, now Patent No. 3,564,528, which is a continuation-in-part of applications Ser. No. 573,999, Aug. 22, 1966, now Patent No. 3,508,115, Ser. No. 583,875, Oct. 3, 1966, now Patent No. 3,591,851, Ser. No. 585,395, Oct. 10, 1966, now Patent No. 3,521,083, and Ser. No. 595,189, Nov. 17, 1966, now Patent No. 3,471,750. Divided and this application Feb. 16, 1971, Ser. No. 115,667

Int. Cl. B01k *3/00;* B23p *1/00*

U.S. Cl. 204—129.2 11 Claims

ABSTRACT OF THE DISCLOSURE

An electronic circuit and method for providing an output signal in response to a voltage surge in an electroerosion machining circuit or the like. The electronic circuit comprises a resistor connected across the gap of an electroerosion machining circuit between a workpiece and tool, a filter circuit connected across the resistor for filtering extraneous signals from sensed voltage surge signals and providing a substantially unchanged voltage surge output signal substantially immediately on occurrence of a voltage surge, an output amplifier circuit for providing a substantial output signal on receipt of a voltage surge signal of a predetermined magnitude and an alternating signal coupling circuit connected between the filter circuit and output amplifier circuit for coupling filtered voltage surge signals to the output amplifier circuit without extraneous voltage signals.

CROSS REFERENCE TO RELATED APPLICATIONS

This application is a division of patent application Ser. No. 595,442, filed Nov. 18, 1966, now U.S. Pat. No. 3,564,528, which is a continuation-in-part of patent applications Ser. No. 573,999, filed Aug. 22, 1966, now Pat. No. 3,508,115; Ser. No. 583,875, filed Oct. 3, 1966 now U.S. Pat. No. 3,591,851; Ser. No. 585,395, filed Oct. 10, 1966, now Pat. No. 3,521,083, and Ser. No. 595,189, filed Nov. 17, 1966, now Pat. No. 3,471,750.

BACKGROUND OF THE INVENTION

Field of the invention

The invention relates to electronic control circuits for electroerosion machining or the like and refers more specifically to a control circuit for developing an output signal substantially immediately on receipt of and in response to a sensed voltage surge having a predetermined magnitude in an electrochemical machining circuit between the work and tool across the gap in the machining circuit.

Description of the prior art

In the past, electroerosion machining equipment has generally been provided a control circuit for sensing electrical signal conditions in the gap between a workpiece and a tool and providing an output signal therefrom for controlling the electroerosion machining process.

In the past, undesirable voltage surge signals have sometimes been determined due to the usual current increase accompanying voltage surges or have been considered in conjunction with general voltage level sensing circuits.

Voltage surge has not been effectively monitored in electroerosion machining equipment in the past as a separate parameter.

Voltage surge sensing circuits in the past wherein they have been provided have not been sufficiently restrictive in response and thus have provided output signals due to other than a monitored voltage surge. That is to say, they have also provided control signals on sensing of extraneous, short duration, high voltage change signals which is undesirable.

SUMMARY OF THE INVENTION

In accordance with the invention, a specialized circuit for and method of sensing voltage surges of a predetermined magnitude and providing an output signal in response thereto and only in response thereto is provided. The voltage surge circuit provided includes structure for sensing voltage across the working gap in electroerosion machining equipment, filter means to filter the voltage surge signal from other extraneous signals and provide a true voltage surge signal substantially immediately on sensing thereof, an output amplifier for providing an output signal in response to a voltage surge signal of a predetermined magnitude and an alternating signal coupling circuit between the filter circuit and output amplifier circuit for coupling the filtered surge voltage signal and only the filtered surge voltage signal to the output amplifier.

BRIEF DESCRIPTION OF THE DRAWING

The drawing is a schematic diagram of a voltage surge circuit constructed in accordance with the invention for performing the method of the invention connected across the machining gap between a workpiece and tool of an electrochemical machining circuit.

DESCRIPTION OF THE PREFERRED EMBODIMENTS

The voltage surge monitoring circuit 10 shown in the figure includes the input filter circuit 12, the alternating current coupling circuit 14, and the output amplifier circuit 16. As shown, the monitoring circuit 10 is connected in parallel with resistor 18 across the gap between workpiece 20 and tool 22 in the electrochemical machining circuit 24.

More specifically, the input filter circuit 12 includes the resistor 26, diode 28, and capacitor 30 along with the additional resistors 32 and 34, diode 36 and capacitor 38. The resistors 26, 32 and 34 along with the capacitors 30 and 38 diminish severe voltage variations present across the work 20 and tool 22 without any detrimental effect on the voltage surge signal information at that point. The diodes 28 and 36 prevent feedback during filtering. The input filter circuit 12 will not appreciably filter a sustained voltage surge which it is desired to sense, which may be of relatively low magnitude as determined by Zener diode 40.

The coupling circuit 14 includes the capacitor 42, resistor 44 and choke coil 46. The capacitor 42 is an alternating current coupling member for passing only the variation or alternating component of the voltage signal across the resistor 44 through coil 46 and diode 48 to the base of the transistor 50. Choke coil 46 is provided to filter out signal spikes which may pass capacitor 42 while diode 48 prevents feedback across resistor 52 and capacitor 54, which are also provided to remove any remaining spikes that may pass through diode 48.

The amplifier circuit 16 includes the transistor 50 having a base connected to receive the signal across the resistor 52 and capacitor 54 through the current limiting resistor 56. Transistor 50 further includes the emitter connected through resistor 58 to the source of minus twenty volts negative potenial illustrated and connected through the Zener diode 40 to ground. The collector of the transistor 50 is connected through the resistor 60 to the source of negative twenty volt electrical energy shown.

An output is taken from the collector of transistor 50 over conductor 62 to perform any desired control function desired on occurrence of a voltage range of predetermined magnitude. The same output from the transistor 50 is fed through capacitor 64 over resistor 66, through diode 68 and over conductor 70. The capacitor 64, resistor 66 and diode 8 provide an output signal only on a positive signal from the front edge of the voltage surge signal sensed by the voltage surge circuit 10 and isolate the voltage surge circuit 10 from feedback on conductor 70.

Thus, in operation of the voltage surge circuit 10 on occurrence of a voltage surge across the gap between the work 20 and the tool 22, the surge will be passed through the filter circuit 12 where severe voltage variations are filtered but the voltage surge signal is not substantially changed in character or delayed for any appreciable period. The filtered voltage surge signal is then coupled across capacitor 42 to the base of the normally off transistor 50 after any spikes have been filtered from the voltage surge signal by the coil 46 and resistance 48 in conjunction with capacitor 54.

The resistor 58 and negative voltage source in conjunction with the Zener diode 40 apply for example a minus 2.4 volt potential on the emitter of the transistor 50. Therefore, a rather small amplitude voltage surge of, for example two volts, will cause the transistor 50 to conduct whereby the signal on the collector will rapidly go from approximately minus twenty volts to approximately three volts to provide a large positive pulse on conductor 62 and through the diode 68 on the leading edge of the voltage surge reaching the critical value of, for example, two volts.

Only the initial edge of the large positive pulse from transistor 50 will provide an output signal on conductor 70 through capacitor 64. The output signal from circuit 10 on conductor 70 is therefore a short duration spike.

While one embodiment of the voltage surge circuit and method of the invention has been described in detail herein, it will be understood that other embodiments and modifications are contemplated by the inventor. It is the intention to include all modifications and embodiments of the voltage surge circuit as are defined by the appended claims within the scope of the invention.

What I claim as my invention is:

1. Structure for detecting voltage surges in an electro-erosion machining circuit comprising voltage sensing means for sensing voltage in the electric circuit, means connected to the voltage sensing means for filtering the sensed voltage to remove voltage variations other than voltage surge variations therefrom, an output amplifier circuit for providing an output in response to an input signal voltage variation greater than a predetermined maximum voltage variation and alternating current coupling means connected between the filter means and output amplifier circuit for coupling only sensed voltage surge variation signals from the filter means to the output amplifier circuit.

2. Structure as set forth in claim 1 wherein the voltage sensing means comprises a first resistor connected in parallel with a portion of the electric circuit, the voltage surge in which it is desired to sense, the filter means comprises a second resistor, first diode and a capacitor connected in series across the first resistor, a third resistor, second diode and a second capacitor connected in parallel with the first capacitor and a fourth resistor connected in parallel with the second capacitor and the coupling means comprises means for taking a filtered output across the parallel connected second capacitor and fourth resistor whereby voltage surges across the portion of the electric circuit are passed directly through the filter means substantially unchanged.

3. Structure as set forth in claim 1 wherein the alternating current coupling means comprises a first coupling capacitor connected to the filter means, a choke coil, diode and resistor connected in series between the coupling capacitor and the output amplifier circuit, a first resistor connected between the coupling capacitor and choke coil at end end and to electronic common at the other end and a third resistor connected between the diode and first resistor at one end and to electronic common at the other end whereby voltage surge signals passed to the coupling means are coupled to the output amplifier without extraneous voltage variations.

4. Structure as set forth in claim 3 wherein the coupling means further includes a capacitor connected in parallel with the third resistor providing a time constant with the third resistor to maintain a signal output from the coupling means to the output amplifier circuit for a time determined by the time constant on coupling of a voltage surge signal to the output amplifier circuit.

5. Structure as set forth in claim 1 wherein the output amplifier circuit comprises a normally off semi-conductor having emitter, base and collector electrodes, a first resistor connected at one end to the emitter electrode of the semi-conductor and to the other end to a source of negative electrical potential, a Zener diode connected across the first resistor for limiting the negative potential applied to the emitter electrode of the semi-conductor to substantially less than the potential of the source of negative potential, a second resistor connected between the collector of the semi-conductor and a second source of negative potential and means for taking an output across the second resistor whereby no application of a positive signal of a potential approaching the negative potential to which the emitter is limited by the Zener diode the normally off semi-conductor will conduct to raise the potential at the collector of the semi-conductor to approach the limiting value of the potential established at the emitter of the semi-conductor by the Zener diode and thus provide a positive going output signal.

6. Structure as set forth in claim 5 wherein the means for taking an output across the second resistor comprises an output circuit connected to the collector of the semi-conductor including a capacitor and diode connected in series with one end of the capacitor being connected to the collector of the semi-conductor and a third resistor connected at one end between the capacitor and diode and to electronic common at the other end whereby an output pulse is provided through the diode only in response to the initial positive movement of the potential at the collector of the semi-conductor.

7. Structure as set forth in claim 1 wherein the electric circuit in which voltage surges are to be sensed comprises a workpiece, a spark gap and a tool connected in series across a source of unidirectional electrical energy with the work positive and the tool negative, the sensing means includes a first resistor connected in parallel with the gap between the work and tool, the filter means comprises a second resistance, a first diode for limiting current flow toward the work and a first capacitor connected in series with each other and in parallel with the first resistor, a third resistor, a second diode for limiting current flow toward the work and a second capacitor connected in series with each other and in parallel with the first capacitor and a fourth resistor connected in parallel with the second capacitor, the coupling means includes a coupling capacitor, a choke coil, a diode for preventing current movement toward the choke coil and a fifth resistor connected in series with one end of the third capacitor connected between the second diode and second capacitor and one end of the fifth resistor connected to the output amplifier circuit, a sixth resistor connected between the third capacitor and choke coil at one end thereof and to electronic common at the other end, a seventh resistor connected between the third diode and fifth resistor at one end and electronic common at the other, and a capacitor connected in parallel with the seventh resistor and the output amplifier circuit comprises a semi-conductor having emitter, base and collector electrodes, the base electrode of which is connected to the one end of the fifth resistor, an eighth resistor connected between the emitter electrode of the semi-conductor and a source of —20 volt potential, a Zener diode connected in parallel with the eighth resistor for limiting the potential on the emitter electrode to approximately —2.4 volts, a ninth resistor connected between the collector electrode of the semi-conductor and a source of —20 volt potential and means for taking an output signal from the semi-conductor across the ninth resistor comprising a fifth capacitor and fourth diode in series and a tenth resistor connected between the fifth capacitor and fourth diode at one end and to electronic common at the other end.

8. A voltage surge circuit for detecting a voltage surge in an electroerosion machining circuit and providing an output substantially immediately in response thereto including an input filter circuit connected across the machining circuit for removing undesired variations in the machining circuit signal without substantially changing the voltage surge characteristics thereof, normally off amplifier circuit means having means for filtering voltage spikes in the input circuit thereto, and an alternating current coupling circuit for coupling the voltage surge signal with the undesired characteristic removed therefrom to the amplifier circuit means through the means for filtering spikes.

9. Structure as set forth in claim 8 and further including a time constant circuit in the input circuit to the amplifier means whereby the amplifier means is maintained in an on condition for a time after a voltage surge signal in the machining circuit.

10. The method of detecting a voltage surge in an electroerosion machining circuit comprising sensing the voltage signal in the circuit, removing undesired variations therein without changing the voltage surge characteristics thereof and amplifying the voltage surge signal with the undesired variations removed therefrom during the voltage surge signal and for a predetermined time thereafter.

11. Structure for detecting voltage surges in an electroerosion machining circuit comprising voltage sensing means for sensing voltage in the electric circuit, means connected to the voltage sensing means for filtering the sensed voltage to remove voltage variations other than voltage surge variations therefrom, an output amplifier circuit for providing an output in response to an input voltage surge variation signal and alternating current coupling means connected between the filter means and output amplifier circuit for coupling only sensed voltage surge variation signals from the filter means to the output amplifier circuit.

References Cited

UNITED STATES PATENTS

| | | | |
|---|---|---|---|
| 3,650,923 | 3/1972 | Berghausen et al. | 204—228 X |
| 3,650,940 | 3/1972 | Bardahl | 204—228 X |
| 3,652,440 | 3/1972 | Dehner | 204—228 |
| 3,664,945 | 5/1972 | Junker et al. | 204—143 M X |

JOHN H. MACK, Primary Examiner

D. R. VALENTINE, Assistant Examiner

U.S. Cl. X.R.

204—228